H. D. WEED.
TREAD SECTION FOR ANTISKIDDING DEVICES.
APPLICATION FILED MAR. 26, 1908.
1,079,907. Patented Nov. 25, 1913.
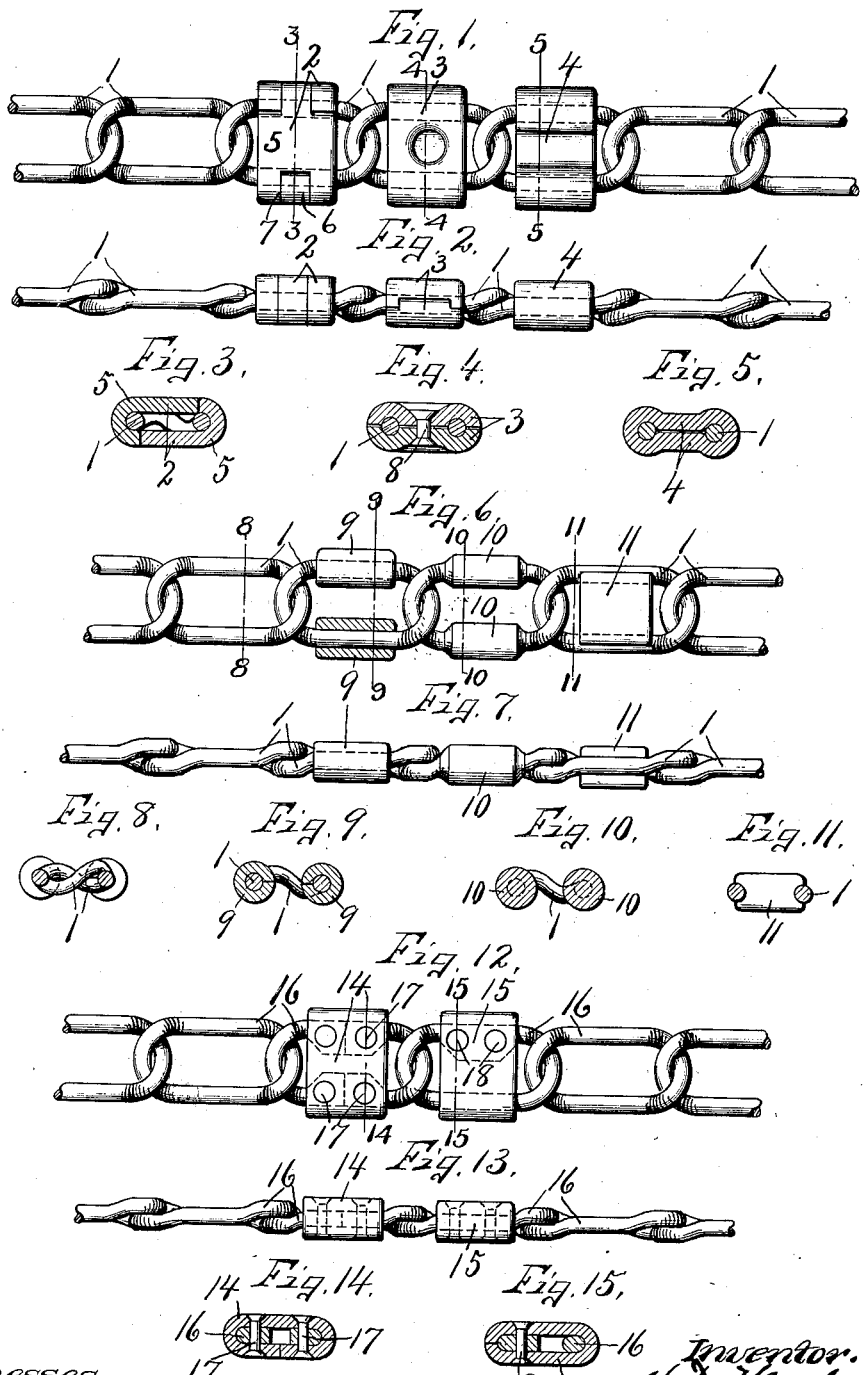

UNITED STATES PATENT OFFICE.

HARRY D. WEED, OF SYRACUSE, NEW YORK.

TREAD-SECTION FOR ANTISKIDDING DEVICES.

1,079,907.

Specification of Letters Patent.

Patented Nov. 25, 1913.

Application filed March 26, 1908. Serial No. 423,323.

*To all whom it may concern:*

Be it known that I, HARRY D. WEED, of Syracuse, in the county of Onondaga, in the State of New York, have invented new and useful Improvements in Tread-Sections for Antiskidding Devices, of which the following, taken in connection with the accompanying drawings, is a full, clear, and exact description.

This invention relates to certain improvements in tread sections for anti-skidding devices adapted to be applied to the periphery of the tires of vehicle wheels and particularly to either pneumatic or solid rubber tires.

My main object is to increase the longevity and durability of the tread sections of those parts of the anti-skidding device which extend across the tread of the tire and commonly known as " cross chains " and still preserve the full flexibility of the tread sections in all directions.

Another object is to make the tread section as an integral unit constituting an article of manufacture adapted to be sold and used in connection with circular side pieces or other means for holding them in place upon the tread of the tire.

A further object is to construct the interlocking ends of the links of the cross chains in such manner that they may readily flex laterally and radially and still be prevented from rolling or turning edgewise upon the tire when adjusted for use. In other words, I have sought to construct a tread section in the form of a cross chain composed of interlocked links flexible in all directions and having similar wearing surfaces projecting from the inner and outer faces of some of the links so that the tread sections may be reversed upon the tire.

Other objects and uses relating to specific structural elements will be brought out in the following description.

In the drawings—Figures 1 and 2 are respectively a top plan and a side elevation of one of the cross chains or tread sections showing the novel features of the construction of the links and also showing modified forms of wearing elements applied to and thickening the intermediate portions of the tread. Figs. 3, 4 and 5 are transverse sectional views taken respectively on lines 3—3, 4—4 and 5—5, Fig. 1. Figs. 6 and 7 are respectively a top plan and a side elevation of a tread section showing further modifications of wearing elements, one of said wearing elements being shown in section in Fig. 6. Figs. 8, 9, 10 and 11 are sectional views taken respectively on lines 8—8, 9—9, 10—10 and 11—11, Fig. 6. Figs. 12 and 13 are respectively a top plan and a side elevation of a portion of a tread section showing still further modified forms of wearing elements and Figs. 14 and 15 are sectional views taken respectively on lines 14—14 and 15—15, Fig. 12.

In Figs. 1 to 5 inclusive I have shown the greater portion of a tread section which may be of any desired length according to the transverse width of the tire to which it is applied and which in this instance consists of a chain composed of a series of similar open wire links —1— having the intermediate portions of their sides disposed in substantially the same flat plane and their ends twisted in opposite directions and interlocked with each other, said interlocking ends being rounded or curved constituting universal joints to permit them to flex radially in all directions one upon the other. These tread sections or cross chains are adapted to be drawn transversely across and upon the periphery of the tire, not shown, with their ends attached to suitable attaching elements, also not shown for the reason that the attaching elements form no part of my present invention, and the tread sections are adapted to be attached at the ends to any suitable device holding them in operative position upon the periphery of the tire.

The interlocking ends of the links are twisted slightly in opposite directions in such manner as to permit all of the links to lie flatwise against the tire as best seen in Fig. 8, in which it will be observed that the ends of the links form reverse or compound curves which are deflected from the plane of the intermediate portions of the links a distance not exceeding the thickness of the links thereby permitting the ends as well as the intermediate portions to remain nearly flat against the tire and when adjusted for use this manner of twisting the links brings the interlocking ends into close engagement with each other and prevents said links from turning edgewise upon the tire; that is the resistance to turning edgewise is inherent in the interlocking ends of the links and not so much by reason of the fact that the links lie flatwise upon the tire thereby relieving the tire of much of the wear incidental to the engagement of the edges of the links therewith.

In order to increase the longevity of the tread sections one or more of the intermediate links at the center of the tread which is subjected to the greatest wear is or are thickened by adding extra material thereto either in the form of extra wearing plates as shown in Figs. 1 to 5 inclusive and Figs. 9, 11 and 12 to 15 inclusive or by simply enlarging the intermediate portion of the links as shown in Fig. 10.

In Figs. 1 and 2 I have shown a series of in this instance, three, of the links as provided with different forms of wearing elements —2—, —3— and —4—, the wearing element —2— consisting of opposite similar metal plates —5— applied to opposite sides of the intermediate portion of one of the links —1—, each of the plates —5— being provided at one end with a tongue —6— and at its opposite end with a groove —7—, the tongue of one plate fitting into the groove of the other plate as best shown in Fig. 1, said tongues being bent around opposite sides of the link and the opposite sides of the ends of the plates in which the grooves are formed are similarly bent around the adjacent sides of the links thereby clenching and firmly retaining the plates upon said link. The wearing element —3— is similar to the wearing element —2— in that it consists of two opposed wearing plates secured respectively to the inner and outer faces of the intermediate portion of the adjacent link —1— but in this instance the meeting faces of the plates are substantially midway between the inner and outer faces of the link while intermediate portions of the plates are secured together by a rivet —8— passing through apertures in said plates substantially midway between the opposite sides of the link as best seen in Fig. 4. The wearing element —4— preferably consists of a flattened tube embracing the intermediate portion of one of the links and having its central portion flattened between the opposite sides of said link for firmly retaining it in place. In each of these modifications it will be seen that the inner and outer faces of the wearing elements 2—2, —3— and —4— are similar, which permits the entire tread section to be reversed so that either side may be applied next to the tire and when one side becomes worn the tread may be inverted or reversed and the unworn side placed outermost thereby practically doubling the life of the tread section without materially impairing the integrity of the entire tread section or links of which it is composed. The advantage of this construction will be clearly apparent when it is considered that in the ordinary cross chain which is now in common use and made of twisted links, the wear comes almost wholly upon the interlocking ends of the links whereas in my present structure this wear is borne entirely by the thickened portions of said links at the intermediate portions and not at the interlocking ends of such links.

In Fig. 6 I have shown three modified forms of wearing elements —9—, —10— and —11— which are also seen in Figs. 9, 10 and 11 respectively, the wearing elements —9— consisting of separate metal tubes which are clamped around and upon opposite sides of one of the links and are usually split through one side to enable them to be readily wrapped or folded around and upon the sides of said links. The wearing elements —10— are preferably formed integral with the intermediate portions of one of the links as best seen in Fig. 10 which is accomplished by simply thickening said intermediate portions. The wearing element —11— preferably consists of a separate metal plug or insert fitted between and embracing opposite sides of the adjacent link but projecting inwardly and outwardly beyond the plane of said sides, the edges of the wearing plate —11— adjacent the sides of the links being curved for receiving said sides and retaining the element or insert —11— in operative position.

In Figs. 12 and 13 I have shown further modifications of wearing elements —14— and —15— which surround and embrace the opposite sides of intermediate portions of sheet metal links —16—. The wearing plate —14— is preferably made of sheet metal bent around the intermediate portion of one of the links —16— and secured thereto by rivets —17— as best seen in Fig. 14 in which instance the opposite sides of the intermediate portion of the link —16— are flattened and provided with apertures for receiving the rivets —17— which are passed through similar apertures in the inner and outer sides of the plate —14—. The wearing element —15— is quite similar to the wearing element —14—, that is it is formed of sheet metal such as steel and is folded around the intermediate portion of the adjacent link with its ends abutting at one side of said link and secured to the adjacent side by a rivet —18—. In all of these several modified structures, the inner and outer sides of the wearing elements are similar and project uniform distances inwardly and outwardly from the plane of the intermediate portion of the link, thus permitting either side to be applied to the tire and the opposite side to be used as the wearing surface which relieves the interlocking ends of the links from excessive wear and materially increases the life of the tread section.

It will be obvious from the foregoing description that in all of these modifications, the opposite sides of the intermediate portion of each link lies in the same flat plane while its ends are twisted slightly from said plane and interlocked with each other and the intermediate portions which are disposed in substantially the same flat plane are either thickened by applying wearing plates thereto or by enlarging the sides of the link as shown in Fig. 10, the purpose in each case being the same, viz. to allow all of the links to lie flatwise against the tire and to increase the longevity of the tread without interfering in any way with its flexibility in all directions, the particular twist of the interlocking ends of said links affording such flexibility and at the same time preventing any one of the links from turning edgewise upon the tire when the tread is adjusted for use.

What I claim is:

1. A tread section for anti-skidding devices comprising a chain having the greater portion of the opposite sides of its links disposed in the same plane and its ends twisted.

2. A tread section for anti-skidding devices comprising a chain having the greater portion of the opposite sides of its links disposed in the same plane and its ends twisted in opposite directions.

3. A cross chain for anti-skidding devices having continuous open wire tread links, the central portions of which between and exclusive of their ends are provided with extra wearing material, said ends being disposed at an angle to the plane of the central portions of the links.

4. An anti-skidding cross chain for tires having the opposite ends of its links twisted and the central portion of at least one of the links between and exclusive of the ends provided with extra wearing material.

5. An anti-skidding cross chain for tires having the greater portion of the opposite sides of its tread links disposed in the same flat plane and reinforced with extra metal and their ends twisted.

6. An anti-skidding cross chain for tires, said chain being composed of solid open wire links, each link having its opposite sides disposed in the same flat plane and its ends twisted relatively thereto, and extra metal applied to the opposite sides of said links between and exclusive of the twisted ends.

In witness whereof I have hereunto set my hand this 21st day of March 1908.

HARRY D. WEED.

Witnesses:
H. E. CHASE,
CAROLINE McCORMACK.